US010775876B2

(12) United States Patent
Gibney et al.

(10) Patent No.: US 10,775,876 B2
(45) Date of Patent: Sep. 15, 2020

(54) METHOD AND APPARATUS FOR CONTROLLING POWER CONSUMPTION OF AN INTEGRATED CIRCUIT

(71) Applicant: Advanced Micro Devices, Inc., Santa Clara, CA (US)

(72) Inventors: Thomas J. Gibney, Boxborough, MA (US); Sonu Arora, Cherry Hill, NJ (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 90 days.

(21) Appl. No.: 15/858,138

(22) Filed: Dec. 29, 2017

(65) Prior Publication Data

US 2019/0204902 A1 Jul. 4, 2019

(51) Int. Cl.
*G06F 1/00* (2006.01)
*G06F 1/3296* (2019.01)
*G06F 1/28* (2006.01)
*G06F 1/3206* (2019.01)
*G06F 1/324* (2019.01)

(52) U.S. Cl.
CPC .............. *G06F 1/3296* (2013.01); *G06F 1/28* (2013.01); *G06F 1/324* (2013.01); *G06F 1/3206* (2013.01)

(58) Field of Classification Search
CPC ...................................................... G06F 1/3296
See application file for complete search history.

(56) References Cited

U.S. PATENT DOCUMENTS

| | | | | |
|---|---|---|---|---|
| 6,756,771 B1 * | 6/2004 | Ball | G05F 1/70 | 323/222 |
| 7,042,776 B2 | 5/2006 | Canada et al. | | |
| 8,984,313 B2 * | 3/2015 | Bhandaru | G06F 1/26 | 713/320 |
| 2004/0064755 A1 * | 4/2004 | Therien | G06F 1/1632 | 714/10 |
| 2005/0114725 A1 * | 5/2005 | Patel | G01R 35/005 | 713/500 |
| 2008/0191623 A1 * | 8/2008 | Schonfelder | H01K 1/50 | 313/570 |
| 2012/0049961 A1 * | 3/2012 | Ripley | H03G 3/007 | 330/278 |
| 2014/0333245 A1 * | 11/2014 | Kammleiter | H02P 29/024 | 318/400.22 |
| 2015/0102856 A1 * | 4/2015 | Barrett, Jr. | G05F 3/30 | 327/539 |
| 2015/0121103 A1 * | 4/2015 | Kanemasa | G06F 1/324 | 713/322 |
| 2015/0346798 A1 * | 12/2015 | Dongara | G06F 1/3206 | 713/320 |
| 2018/0067535 A1 * | 3/2018 | Kosonocky | G06F 1/3209 | |
| 2018/0284878 A1 * | 10/2018 | Artieri | G06F 1/324 | |

* cited by examiner

*Primary Examiner* — Mohammed H Rehman
(74) *Attorney, Agent, or Firm* — Faegre Drinker Biddle & Reath LLP

(57) ABSTRACT

A method and apparatus control power consumption of at least one functional unit on an integrated circuit by determining that a change in a first performance state is required for the at least one functional unit, and changing the first performance state to a second performance state that sets voltage for the functional unit to be at an under-voltage margin setting with respect to a nominal product minimum voltage of the functional unit.

23 Claims, 6 Drawing Sheets

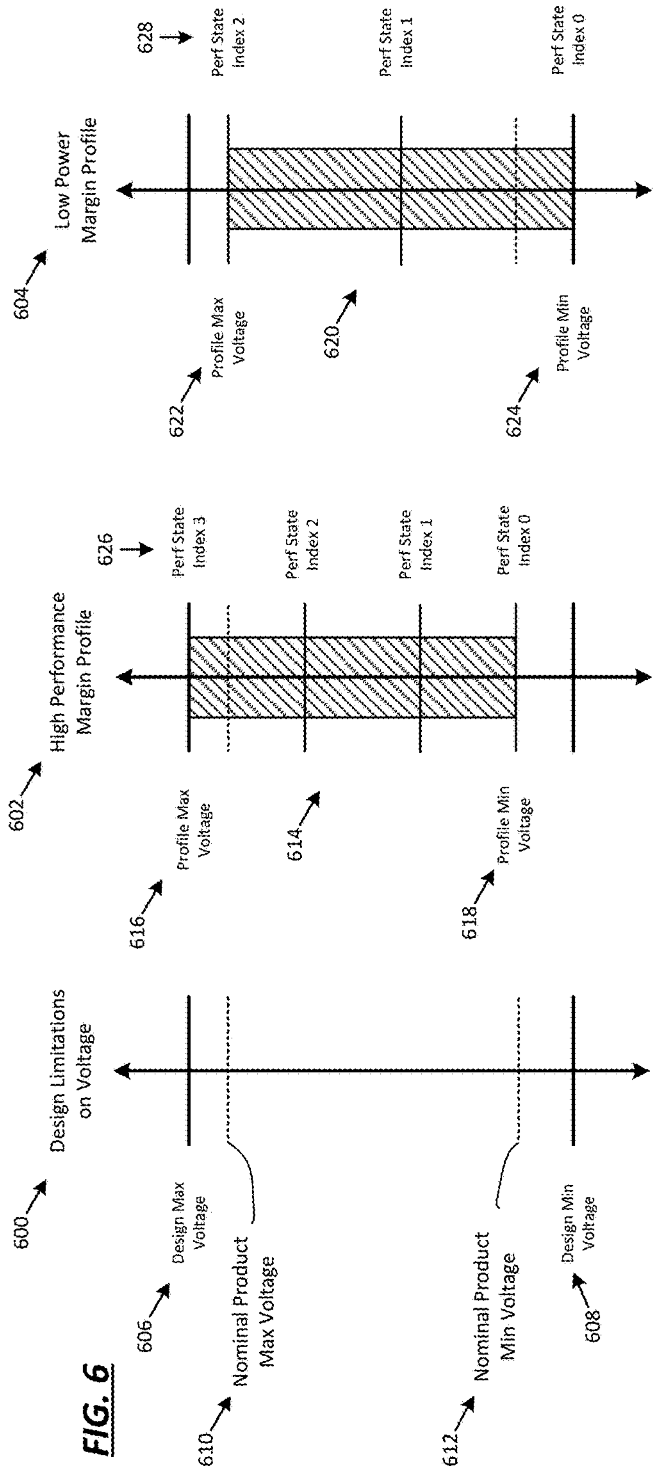

High Performance Margin Profile State Table

| Margin Table Index (704) | Performance State Index (Voltage index) (626) | Frequency Setting (706) | Voltage Setting (708) | SRAM Margin Settings (710) |
|---|---|---|---|---|
| 722 → 0 (720) | 3 | F3 | V3 | Default Setting |
| | 2 | F2 | V2 | |
| | 1 | F1 | V1 | |
| | 0 | F0 | V0 | |

702

Low Power Margin Profile State Table

| Margin Table Index (712) | Performance State Index (Voltage index) (628) | Frequency Setting (714) | Voltage Setting (716) | SRAM Margin Settings (718) |
|---|---|---|---|---|
| 720 → 1 (724) | 2 | F2 | V2 | Slow/Vmin Setting |
| | 1 | F1 | V1 | |
| | 0 | F0 | V0 | |

*FIG. 7*

METHOD AND APPARATUS FOR CONTROLLING POWER CONSUMPTION OF AN INTEGRATED CIRCUIT

BACKGROUND OF THE DISCLOSURE

The evolution of modern processor architectures, in conjunction with technology scaling, has produced processors with higher performance to meet today's increasing computational demands, and also helped make power efficiency one of the paramount design concerns and objectives for a wide spread of enterprise-class and embedded processors. In addition to saving energy, proper reduction of power consumption can lead to dramatic benefits in reducing thermal hot spots and the cost of chip-cooling. Researchers have been devoted to the optimization of processors, for example system-on-a-chip (SoC) processors, whose key to optimization is to operate at the most efficient frequency and voltage, depending on the workload requirements. As an example, power efficient optimization prefers the lowest voltage, since power is proportional to the square of voltage. On the other hand, optimization for the highest performance may require the highest frequencies possible. In both cases, it is important to run at the highest frequency within the given voltage.

To this end, dynamic voltage and frequency scaling (DVFS) has become a key avenue for achieving power efficiency via adjustment of the operating voltage and frequency of processors in runtimes for devices such as web servers, smartphones, tablet devices, laptops, and other devices. One central challenge in developing DVFS schemes is to balance two competing objectives: maximizing of power saving and achieving high performance based on workload demand. The latter is particularly critical for latency-sensitive applications that require a high degree of quality of service (QoS). Therefore, successfully achieving power efficiency realizes lower total energy consumption for the processors without sacrificing QoS from the perspective of the user.

In this respect, DVFS is an established technique for run-time selection of performance states, also referred to as P-states, at most optimal frequency and voltage point. However, the effectiveness of DVFS can be limited by the voltage range for operation, and the granularity of islands for independent voltage control.

The voltage range for DVFS optimization is traditionally limited by voltage margin requirements related to yield and reliability of the design. These limits are determined based on the worst case assumptions of product usage. For example, in static random access memory (SRAM), a nominal product minimum voltage and a nominal product maximum voltage are the minimum and maximum voltages, respectively, of a product-specified range of voltage levels, as specified by the manufacturer of the product, at which the voltage level for a functional unit is set during operation. Previous DVFS techniques use fine-grained voltage islands or dual voltage rail SRAM arrays. Fine-grained voltage islands, also known as "power islands", allow for different functional units within a single SoC to operate at different voltage levels and frequencies that are independent of each other. Likewise, dual voltage rail SRAM arrays incorporate a different power supply voltage for each of the memory cells, or bit cells, and the logic circuits, or the peripheral circuits, so that the power supply voltage for the memory cells is maintained at a stable and operable level while the power supply voltage for the logic circuits can be reduced significantly, thereby increasing stability and performance. However, a need exists for an improved power control scheme.

BRIEF DESCRIPTION OF THE DRAWINGS

The embodiments will be more readily understood in view of the following description when accompanied by the below figures and wherein like reference numerals represent like elements, wherein:

FIG. 6 is a graph illustrating one example of a set of margin profiles in accordance with one embodiment of the disclosure; and FIG. 7 is a set of tables illustrating one example of a set of margin profile state tables in accordance with one embodiment of the disclosure.

DETAILED DESCRIPTION OF EMBODIMENTS

Figure 1:
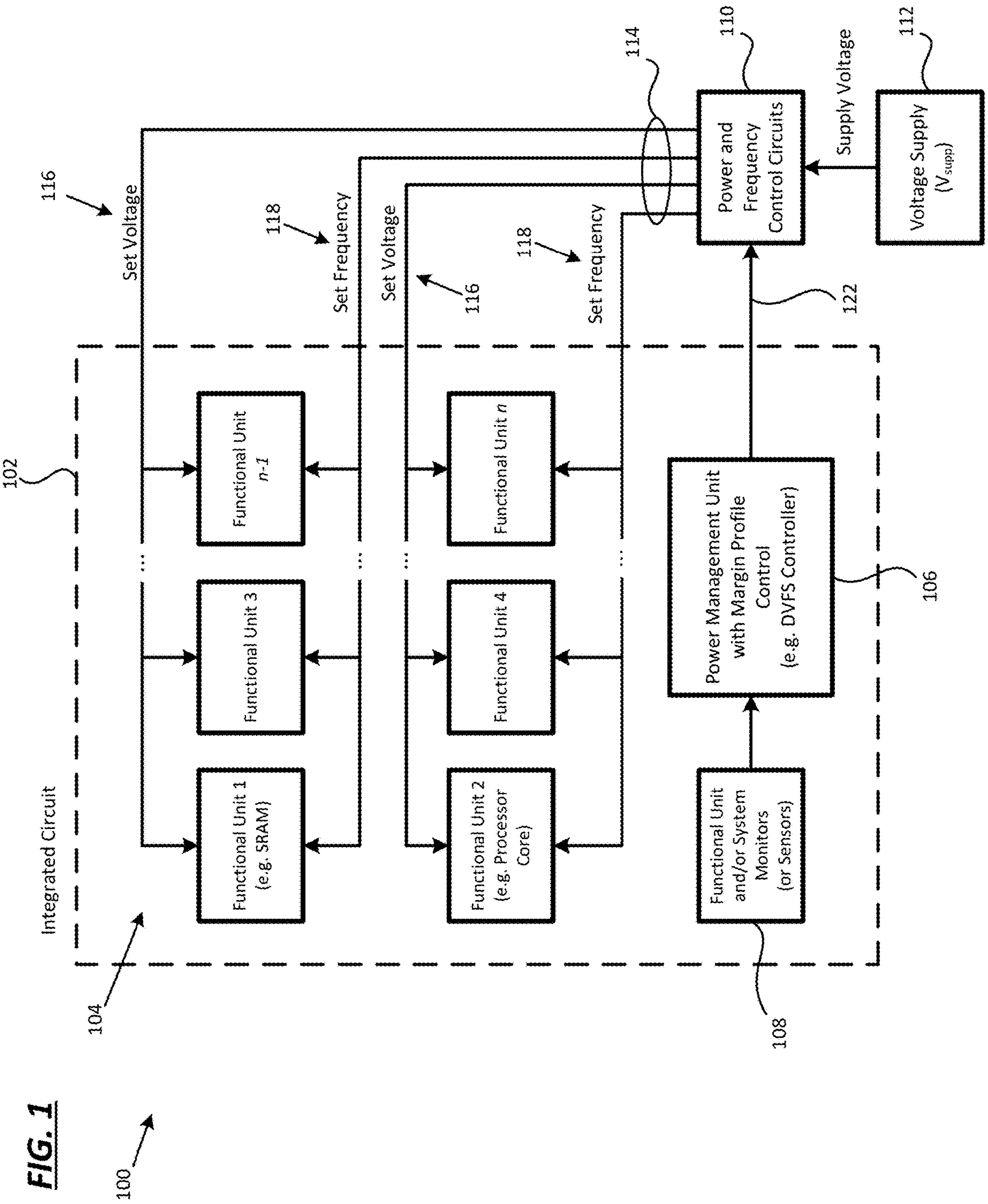
FIG. 1 is a block schematic diagram illustrating one example of an apparatus in accordance with one embodiment of the disclosure.

Briefly, in one example, a method and apparatus control power consumption of at least one functional unit on an integrated circuit by determining that a change in a first performance state is required for the functional unit. The functional unit may be static random access memory (SRAM) or a processing core such as a central processing unit (CPU) core and a graphics processing unit (GPU), but other suitable apparatus may be employed. The method and apparatus change the first performance state to a second performance state that sets voltage for the functional unit to be at an under-voltage margin setting with respect to a nominal product minimum voltage of the functional unit. The under-voltage margin setting is defined as a setting in which the voltage level goes below the nominal product minimum voltage.

In another example, the method and apparatus change the first performance state to a third performance state that sets voltage for the functional unit to be at an over-voltage margin setting with respect to a nominal product maximum voltage of the functional unit. The over-voltage margin setting is defined as a setting in which the voltage level goes above the nominal product maximum voltage. The over-voltage margin setting is used when the power management unit of the apparatus decides that the functional unit requires being in a non-low power mode, or a high performance mode, which is the mode in which the functional unit operates at a voltage and frequency higher than the low power mode. High performance mode may be preferred for various reasons, for example when a higher clock rate is required for a heavier workload than usual, which is also called “overclocking”.

In view of the above, changing from one performance state to another is determined, for example, by activity data sent from the monitors which may indicate the current voltage, frequency, and activity level of the functional unit as well as the system as a whole, or other such factors that affect the functional unit in a way which requires a performance state change. Whether the functional unit has access to the under-voltage or over-voltage margin setting depends on the system in which the integrated circuit is incorporated. For example, if the system is in a notebook computer which requires more efficient use of power to run applications, the functional unit would be more likely to be allowed to enter the under-voltage margin setting, whereas if the system is in a desktop computer which has more power available for use in running applications, the functional unit would be less likely to be allowed access to the under-voltage margin setting, simply because there is no need for the desktop computer to enter such a setting. Instead, the functional unit would be more likely to be allowed access to the over-voltage margin setting because the desktop computer requires better performance depending on the usage of applications by the user.

In one example, the method and apparatus include a plurality of different types of functional units, where each type of functional unit has a different corresponding under-voltage margin setting and over-voltage margin setting. Each type of functional unit has corresponding performance margin profile state data, and each performance margin profile state data defines a plurality of performance states for the corresponding functional unit. The method and apparatus access the performance margin profile state data corresponding to the functional unit. The performance margin profile state data include at least one performance state which sets the voltage for the functional unit to be at the over-voltage margin setting, and at least one other performance state which sets the voltage for the functional unit to be at the under-voltage margin setting. In order to change the first performance state to either of the second or third performance states, the method and apparatus select and use the corresponding performance margin profile state data, based on a detected change between a low power mode and a non-low power mode, which is also called a “high performance mode”, of the functional unit. Such detected change can be sensed by monitors or sensors implemented to be coupled to the functional unit so that the monitors or sensors can detect changes in numerous factors, including but not limited to temperature, frequency, and voltage of the functional unit during operation.

In one example, the method and apparatus store the performance margin profile state data corresponding to each of the different functional units. In one example, the method and apparatus store data regarding the change in the first performance state of the functional unit for future access. For example, the power management unit will later access the data stored regarding if there was a change from one performance state to another, so that the power management unit can refer to the data when making decisions regarding changing performance states in the future. Storing the profile state data and the data regarding the change in the first performance state of the functional unit can be achieved using, for example, a periodic interval timer operatively coupled to the power management unit.

In one example, SRAM is included in the functional unit for local memory storage. In another example, dynamic voltage and frequency scaling (DVFS) logic circuitry selects the second performance state to include a change in a frequency of operation for the functional unit. Each performance state defines a combination of operating voltage and clock frequency, and the DVFS logic circuitry selects the performance state to not only change the operating voltage but also the frequency.

Also as an example, disclosed herein is an integrated circuit which includes at least one functional unit and a power management circuit. The power management unit can be, for example, a microcontroller integrated into the integrated circuit, which controls power consumption of the functional unit by determining that a change in a first performance state is required for the functional unit. As such, the power management unit changes the first performance state to a second performance state that sets voltage for the functional unit to be at an under-voltage margin setting with respect to a nominal product minimum voltage of the functional unit.

In one example, the power management unit has state arbiter control logic circuitry which can be, for example, firmware implemented into the power management unit. The state arbiter control logic circuitry changes the first performance state to a third performance state that sets voltage for the functional unit to be at an over-voltage margin setting. The over-voltage margin setting is with respect to a nominal product maximum voltage of the functional unit.

In one example, the integrated circuit includes a plurality of different types of functional units. Each type of functional unit has a different corresponding under-voltage margin setting and over-voltage margin setting. In one example, the state arbiter control logic circuitry accesses corresponding performance margin profile state data for each of the functional units. Each performance margin profile state data is made up of data representing a plurality of performance states for a corresponding functional unit. The performance margin profile state data can be stored in computer data storage which may be any memory including but not limited to random access memory (RAM), dynamic RAM (DRAM), or static RAM (SRAM), or a processor core, but other suitable apparatus may be employed.

In the performance margin profile state data, at least one performance state sets the voltage for the functional unit to be at the over-voltage margin setting with respect to the nominal product maximum voltage, and at least one other performance state sets the voltage for the functional unit to be at the under-voltage margin setting with respect to the nominal product minimum voltage of the functional unit. The power management circuit changes the first performance state to one of the second or third performance states by using at least one of the first and second performance margin profile state data.

In one example, the power management circuit changes the first performance state to one of the second or third performance states by selecting one of the corresponding performance margin profile state data based on a detected change between a low power mode and a non-low power mode, or high performance mode, of the functional unit. The detected change is a change in any of user activities, system parameters, or environmental parameters.

In the above examples, static usage of the method and apparatus was described, for example a product-based implementation in which the product quality specification determines which performance margin profile state data is to be used for the functional unit. Dynamic usage of the method and apparatus is described below, which incorporate aggregated activity data of the system and the functional unit to determine whether or not the functional units must enter low power settings, or if the functional units are permitted to remain in high performance settings.

In one example, a method and apparatus which control power consumption of at least one functional unit on an integrated circuit determines that a change in a first performance state is required for the functional unit based on the aggregated activity data of the at least one functional unit. The method and apparatus change the first performance state to a second performance state. While in the second performance state, voltage for the functional unit can be set at an under-voltage margin setting with respect to a nominal product minimum voltage of the functional unit. Both the nominal product minimum voltage and the nominal product maximum voltage of the functional unit are predetermined by the manufacturer of the functional unit. In one aspect of the example, the method and apparatus determine that the change in the first performance state is required for the functional unit by accruing activity data representing an amount of time that the functional unit has operated at a non-low power setting, or a high performance setting. In another aspect of the example, the activity data includes performance state data, operating voltage data, temperature data, and/or electric current data of the functional unit.

In one example, the aggregated activity data is data calculated by aggregating activity data pertaining to the corresponding functional unit, such as temperature and frequency of the functional unit and activity level of the system, which are aggregated using counters that are constantly updated to save samples of data relating to the temperature, frequency, and activity level in persistent memory such as SRAM or any other suitable type of memory, so that activity data can be accumulated or be restored after the electronic apparatus 100 is powered off and powered on again. The activity data is monitored by functional unit monitors, for example, which are integrated into the integrated circuit and operatively coupled to the apparatus which controls power consumption. The method and apparatus determine that the change in the first performance state is required by comparing the aggregated activity data to a threshold level of the corresponding functional unit. The threshold level is predetermined empirically through a priori testing of each type of functional unit so that when the aggregated activity data is calculated to be above the threshold level, operation of the corresponding functional unit is restricted at the under-voltage margin setting. Calculating the aggregated activity data can be done, for example, by finding a weighted average for each of the components in the activity data depending on the importance and duration of the component, so that individual component may be compared with that in the threshold level. Another example is to use a mathematical formula to find a number which represents the current activity data for a simpler comparison with the threshold level.

In one example, the method and apparatus change operation of the functional unit from the first performance state to the second performance state by selecting corresponding performance margin profile state data of the functional unit based on the aggregated activity data. The performance margin profile state data is designed such that it distinguishes between highest performance states, or high performance margin profile state data, which cause stress conditions and must be restricted in usage to ensure to ensure optimal voltage margins may be used for the product, from standard performance states, or low power margin profile state data, which may be used without restriction. As such, the performance margin profile state data instructs entering a low power mode for the functional unit when the aggregated activity data indicates that the functional unit has been operating at the non-low power setting for a predetermined period of time.

In another example, a method and apparatus control power consumption of a plurality of different types of functional units on an integrated circuit. As such, each of the different types of functional units has a different corresponding under-voltage margin setting and over-voltage margin setting, which are predetermined empirically for each type of functional unit based on specification and utilization of the type of functional unit.

In one example, the method and apparatus access the corresponding performance margin profile state data for at least one of the plurality of functional units. Each of the performance margin profile state data includes a plurality of performance states for the corresponding functional unit. In the plurality of performance states, at least one performance state sets the voltage for the functional unit to be at the under-voltage margin setting. The method and apparatus change the first performance state to the second performance state by selecting and using at least one of the corresponding performance margin profile state data based on the aggregated activity data of the corresponding functional unit.

For example, when the aggregated activity data of the functional unit is above the threshold level for a predetermined period of time, the method and apparatus select the corresponding performance margin profile state data which includes an under-voltage margin setting in one or more of the performance states, which is the low power margin profile state data, so that access to the non-low power setting is restricted. Thus, the performance state can then be switched to the performance state chosen from the low power margin profile state data. Choosing which performance state within the performance margin profile state data to use as the second performance state can be decided, for example, by referring to the activity data sent from the monitors and choosing the performance state which best matches the current activity data for the functional unit.

As another example, disclosed herein is an integrated circuit which includes at least one functional unit and a power management circuit. The power management circuit determines that a change in a first performance state is required for the functional unit based on aggregated activity data of the functional unit, which is done by, for example, comparing the aggregated activity data to a predetermined threshold level as described below, or using any other suitable method to determine whether a performance state change is required for the functional unit. The power management circuit changes the first performance state to a second performance state that sets voltage for the functional unit to be at an under-voltage margin setting with respect to a nominal product minimum voltage. In one aspect of the example, the power management circuit determines that the change in the first performance state is required for the functional unit by accruing activity data representing an amount of time that the functional unit has operated at a non-low power setting, or a high performance setting.

In one example, the power management circuit further includes state arbiter control logic circuitry which aggregates activity data of the plurality of functional unit in real time to calculate the aggregated activity data. The state arbiter control logic circuitry compares the aggregated activity data to a threshold level of the functional unit. When the aggregated activity data is beyond the threshold level, the state arbiter control logic circuitry restricts operation of the functional unit from the non-low power setting.

In one example, the state arbiter control logic circuitry selects performance margin profile state data corresponding to the functional unit based on the aggregated activity data. When the aggregated activity data indicates that the functional unit has been operating at the non-low power setting for a predetermined period of time, the performance margin profile state data instructs the state arbiter control logic circuitry to enter a low power mode for the functional unit.

In one example, the integrated circuit includes a plurality of different types of functional units, wherein each of the different types of functional units has a different corresponding under-voltage margin setting and over-voltage margin setting.

In one example, the integrated circuit includes a plurality of different types of functional units. Each type of functional unit, such as a processing core, or portion thereof, SRAM, or portion thereof, has a different corresponding under-voltage margin setting and over-voltage margin setting. In one example, the state arbiter control logic circuitry accesses corresponding performance margin profile state data for each of the functional units. Each performance margin profile state data is made up of data representing a plurality of performance states for a corresponding functional unit.

In the performance margin profile state data, at least one performance state sets the voltage for the functional unit to be at the under-voltage margin setting with respect to the nominal product minimum voltage of the functional unit. The power management circuit changes the first performance state to the second performance state by using at least one of the corresponding performance margin profile state data. In another aspect of the example, the power management circuit changes the first performance state to the second performance state by selecting one of the corresponding performance margin profile state data based on the aggregated activity data of the corresponding functional unit.

As another example, disclosed herein is an apparatus, for example SoC, including an integrated circuit with a plurality of functional units and a power management circuit. The power management circuit controls power consumption of the plurality of functional units and includes state arbiter control logic circuitry and memory. The state arbiter control logic circuitry aggregates activity data of the plurality of functional units in real time, to calculate aggregated activity data. The state arbiter control logic circuitry compares the aggregated activity data to corresponding threshold level, and when the aggregated activity data is above the threshold level, restricts operation of a corresponding functional unit at the under-voltage margin setting. The state arbiter control logic circuitry determines that a change in a first performance state is required for the functional unit based on aggregated activity data of the functional unit. The state arbiter control logic circuitry changes the first performance state to a second performance state that sets voltage for the functional unit to be at an under-voltage margin setting with respect to a nominal product minimum voltage.

The state arbiter control logic circuitry accesses corresponding performance margin profile state data for each of the plurality of functional units. Each of corresponding performance margin profile state data includes a plurality of performance states for the corresponding functional unit. At least one of the performance states sets the voltage for the corresponding functional unit to be at the under-voltage margin setting of the corresponding functional unit. The state arbiter control logic circuitry changes the first performance state to the second performance state by selecting and using at least one of the corresponding performance margin profile state data based on functional unit identifier data and the aggregated activity data of the corresponding functional unit. The memory stores the performance margin profile state data corresponding to each of the different functional units.

FIG. 1 illustrates one example of an electronic apparatus 100 in accordance with one embodiment of the disclosure. The electronic apparatus 100 can be a system-on-a-chip (SoC) or any other suitable apparatus that employs one or more functional units. It will be recognized that the high level diagram does not show intervening circuitry as known in the art to facilitate ease of discussion. In this example, the electronic apparatus 100 includes an integrated circuit 102 which contains a plurality of functional units 104, from Functional Unit 1 to Functional Unit n.

Also included are a set of functional unit and/or system monitors 108 which are operably coupled to a power management unit 106, which is operably coupled to a power control circuit 110 located outside the integrated circuit 102. For example, the power management unit 106 may be a dynamic voltage and frequency scaling (DVFS) controller. A voltage supply 112 is connected to the power control circuit 110. A plurality of power rails 114 extend from the power control circuit 110 to each of the functional units 104. Each of the functional units 104 may be any memory, including but not limited to random access memory (RAM), dynamic RAM (DRAM), or static RAM (SRAM), or a processor core, but other suitable apparatus may be employed.

Through the power rails 114, the power control circuit 110 sends set voltage 116 and set frequency 118 to each of the functional units 104 according to the performance states as decided by the power management unit 106. The decision is in part based on activity data 120 from the monitors 108 coupled to the power management unit 106. The monitors 108 send the activity data 120 to the power management unit 106, and in response the power management unit 106 sends frequency and voltage control data 122 to the power control circuit 110.

Figure 2:
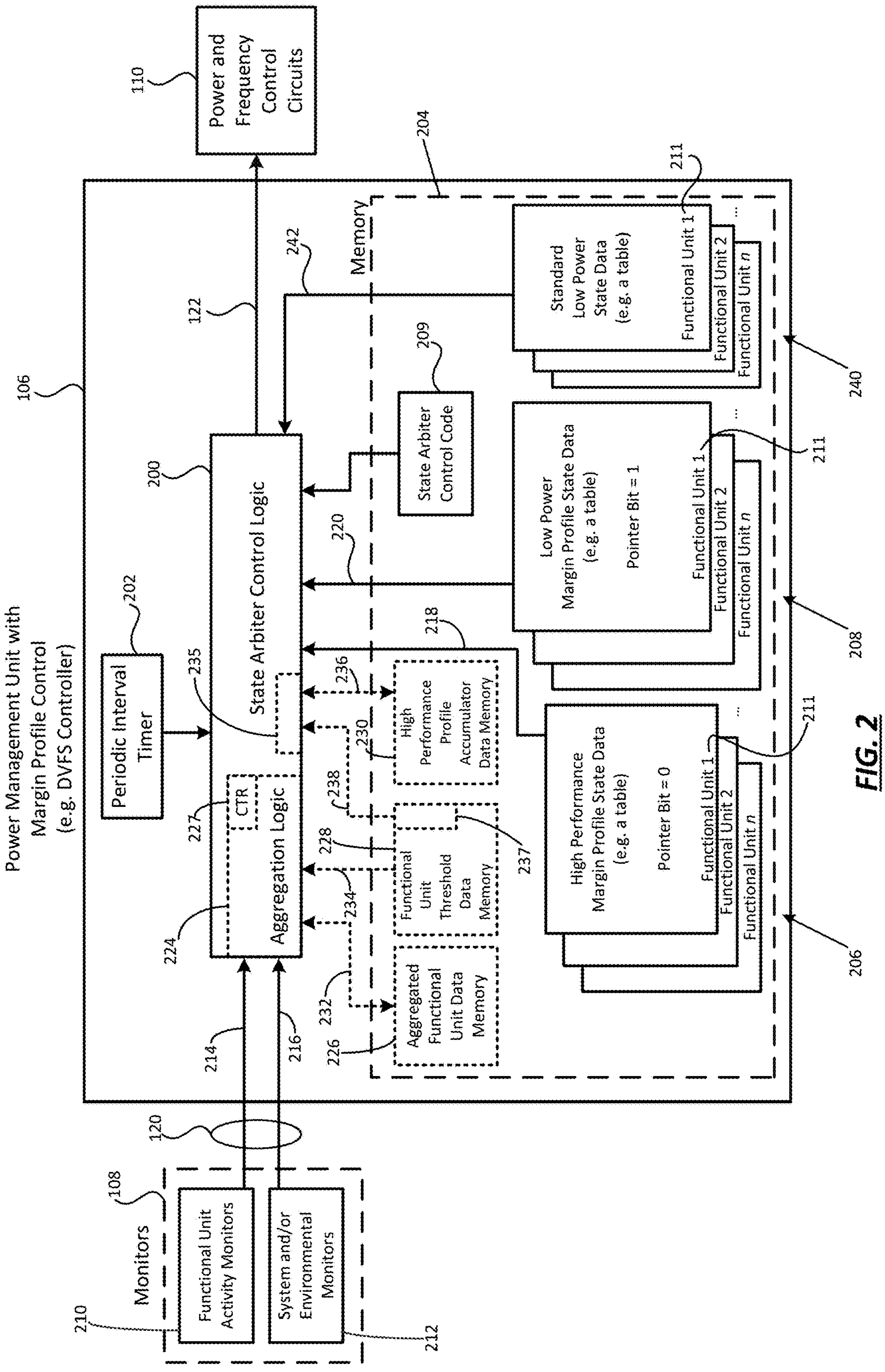
FIG. 2 is a block schematic diagram further illustrating a power management unit in accordance with one embodiment of the disclosure.

FIG. 2 illustrates one example of the power management unit 106 and the monitors 108 shown in FIG. 1. The power management unit 106 includes state arbiter control logic circuitry 200, periodic interval timer 202, and memory 204. The periodic interval timer 202 and memory 204 are both coupled to the state arbiter control logic circuitry 200. The memory 204 includes a set of high performance margin profile state data 206 and low power margin profile state data 208, one of each margin profile state data for each type of the functional units 104 in the integrated circuit 102. In this example, the state arbiter control logic circuitry 200 is one or more processors that execute firmware, and the memory 204 further includes state arbiter control code 209 executed by the state arbiter control logic circuitry 200. The state arbiter control logic circuitry 200 may also be implemented as one or more state machines, or any other suitable logic. The memory 204 can be any computer data storage, which includes but is not limited to random access memory (RAM), dynamic RAM (DRAM), or static RAM (SRAM), but other suitable apparatus may be employed. For example, the margin profile state data 206 and 208 can be arranged in tables for easy access of the data by the state arbiter control logic circuitry 200. As such, each type of the functional units 104 has a high performance margin profile state data 206 and a low power margin profile state data 208. Also, each state data, or table, includes a functional unit identifier 211 which identifies which functional unit the state data pertains to.

In an example which incorporates static usage of the power management unit 106, the monitors 108 include functional unit activity monitors 210 and system and/or environmental monitors 212. The functional unit activity monitors 210 send functional unit activity and identifier data 214 to the state arbiter control logic circuitry 200, and likewise, system and/or environmental monitors 212 send system and/or environmental monitored information 216 to the state arbiter control logic circuitry 200. The state arbiter control logic circuitry 200 accesses the memory 204 to retrieve high performance margin profile data 218 from the high performance margin profile state data 206 and low power margin profile data 220 from the low power margin profile state data 208. The state arbiter control logic circuitry 200 also accesses the periodic interval timer 202 to retrieve periodic interval timer information 222.

Using the functional unit activity monitors 210 and the system and/or environmental monitors 212, as well as the current margin profile index and performance state index data 222, the state arbiter control logic circuitry 200 determines whether it is necessary to change a current performance state to another performance state that sets voltage of the functional unit to be at an under-voltage margin setting. In one example, the under-voltage margin setting is defined by a voltage range bound by the nominal product minimum voltage and a design minimum voltage, in which the design minimum voltage is the minimum voltage possible for use in the functional unit 104. In another example, the under-voltage margin setting can be defined by a voltage range below the nominal product minimum voltage and above any voltage level between the nominal product minimum voltage and the design minimum voltage.

For example, the functional unit activity and identifier data 214 used by the state arbiter control logic circuitry 200 to determine whether the current performance state needs to be changed, may include current temperature, voltage, frequency, and bandwidth of the functional unit, and the system and/or environmental monitored information 216 may include temperature of the overall integrated circuit, any software executed by the system, and the current state of the system, such as whether or not the system is in a "sleep" mode. The functional unit activity and identifier data 214 also identifies which of the functional units 104 the activity data pertains to, so that the state arbiter control logic circuitry 200 knows which corresponding state data to use for the received activity data. For example, the state arbiter control logic circuitry 200 may decide that, once the current voltage of the functional unit reaches a lower threshold voltage level of the current performance state, the functional unit would be required to enter a lower performance state. If the state arbiter control logic circuitry 200 determines that a change in the current performance state is required, the state arbiter control logic circuitry 200 then selects the appropriate margin profile state data 206 or 208, and sends the frequency and voltage control data 122 to the power control circuit 112.

In another example, which incorporates dynamic usage of the power management unit 106 instead of static usage, the state arbiter control logic circuitry 200 additionally includes aggregation logic circuitry 224, and the memory 204 additionally includes aggregated functional unit data memory 226, functional unit threshold data memory 228, and high performance profile accumulator data memory 230, as marked by dotted lines in FIG. 2. The aggregation logic circuitry 224 further includes a counter 227, whose value is stored in the aggregated functional unit data memory 226. The aggregation logic circuitry 224 receives the activity data 120 directly from the monitors 108, and also accesses the aggregated functional unit data memory 226 to update the counter 227 and to retrieve aggregated activity data 232. The aggregation logic circuitry 224 also accesses the functional unit threshold data memory 228 to retrieve threshold level data 234. The counter 227 is used to save samples of activity data 120, including but not limited to frequency and temperature of each of the functional units 104, as well as overall activity level of the electronic apparatus 100. Other factors besides activity levels are also used for selecting performance states. These include temperature readings (relative to threshold limits) and electric current readings (relative to threshold limits), but any suitable readings may be employed.

In addition, the state arbiter control logic circuitry 200 includes high performance profile accumulator 235, which can be implemented in the form of a counter, for example, or any other suitable structure. The high performance profile accumulator 235 is coupled to the memory 204, which is a persistent memory, including but not limited to SRAM and DRAM, so that data 236 from the high performance profile accumulator 235 is stored in the high performance profile accumulator data memory 230 for access by the state arbiter control logic 200 circuitry at any time, for example after the apparatus 100 shuts down and restarts, without losing the high performance profile accumulator data 236. The functional unit threshold data memory further includes configuration data memory 237 which stores information regarding whether dynamic margin profiling is enabled for each of the functional units 104, and the corresponding high performance limit threshold data 238 for the functional unit 104. The high performance profile accumulator 235 is also coupled to the configuration data memory 237 so that the accumulator 235 is able to receive high performance profile limit threshold data 238 pertaining to the functional unit 104.

The aggregation logic circuitry 224 aggregates the activity data 120 and updates the aggregated functional unit data memory 226 with the aggregated activity data 232. For example, calculating aggregated activity data 232 can be done by finding a weighted average for each of the components in the activity data 120 depending on the importance and duration of the component, so that individual component may be compared with that in the threshold level data 234. Another example is to use a mathematical formula to find a number which represents the current activity data for a simpler comparison with the threshold level data 234. The state arbiter control logic circuitry 200 then compares the aggregated activity data 232 with the threshold level data 234. When the aggregated activity data 232 is above the threshold level data 234, the functional unit 104 is working at a non-low power setting, which can also be called a "high performance setting," therefore the state arbiter control logic circuitry 200 restricts operation of the functional unit 104 from the high performance setting after the functional unit 104 keeps operating at the non-low power setting for a predetermined period of time. The predetermined period of time is defined by the periodic interval timer 202 which keeps track of how long the functional unit 104 is operating at the non-low power setting.

For example, the aggregated activity data memory 230 may indicate that the operation voltage of the functional unit 104, which includes SRAM, is at 0.95 volt when the threshold level data 234 has the voltage level limit of 0.9 volt. In this case, the state arbiter control logic circuitry 200 decides that the functional unit 104 is operating at a high performance setting and keeps track of how long the functional unit 104 is operating in the high performance setting using the high performance profile accumulator data memory 230. Whether the functional unit 104 is operating at the high performance setting is determined using the threshold data 234.

The state arbiter control logic circuitry 200 first compares the aggregated activity data 232 with the threshold data 234. When the aggregated activity data 232 is beyond the threshold data 234 as set for the functional unit 104, the state arbiter control logic circuitry 200 determines that the functional unit 104 is in the high performance setting. Then, the state arbiter control logic circuitry 200 updates the high performance profile accumulator 235 and activates the periodic interval timer 202, if the periodic interval timer 202 is not already activated. After a predetermined time passes and the periodic interval timer 202 is expired, the state arbiter control logic circuitry 200 then compares the high performance profile accumulator data 236 with the high performance profile limit threshold data 238 obtained from the functional unit threshold data memory 228. If the state arbiter control logic circuitry 200 determines from the comparison that the functional unit 104 was in the high performance state for a longer period of time than is allowed, the state arbiter control logic circuitry 200 restricts the functional unit 104 from entering the high performance setting any further by restricting the functional unit 104 to operate only under the settings according to the low power margin profile state data 208. For example, the state arbiter control logic circuitry 200 may instruct the functional unit 104 to enter the low power mode when the high performance profile accumulator 230 indicates that the operation voltage of the functional unit 104 has stayed above the limit voltage level of 0.9 volt for more than 20 percent of the total on time.

The high performance profile accumulator 235 keeps track of any of performance state data, operating voltage data, temperature data, electric current data, and/or margin profile state data of the functional unit 104 in order to determine whether the functional unit 104 is operating at the non-low power setting. As such, in one example, the state arbiter control logic circuitry 200 may determine the operating voltage directly from the activity data 214 provided by the monitors 108, or calculate the operating voltage from the performance state data of the functional unit 104. In another example, other parameters such as the temperature data or the electric current data of the functional unit 104 may be used to determine if the functional unit 104 is at the non-low power setting. In one example, the mere fact that the functional unit 104 is operating using a specific margin profile state data, for example the high performance margin profile state data 206, is enough for the state arbiter control logic circuitry 200 to determine that the functional unit 104 is operating at the non-low power setting. Other suitable parameters may also be employed in this regard.

Furthermore, the memory 204 includes a separate set of state data, called standard low power state data 240, whose state data 242 is accessed by the state arbiter control logic circuitry 200 when the state arbiter control logic circuitry 200 determines that the functional unit 104 is not enabling the dynamic margin profiling which permits the functional unit 104 to operate at the under-voltage margin setting. As such, when the dynamic margin profiling is not enabled, instead of using the low power margin profile state data 208, the state arbiter control logic circuitry 200 uses the standard low power state data 240, which may be a table, to determine the next performance state in the functional unit 104. The standard low power state data 240 differs from the low power margin profile state data 208 in that the standard low power state data 240 does not include one or more performance states which set the voltage for the functional unit 104 to be at the under-voltage margin setting.

Figure 3:
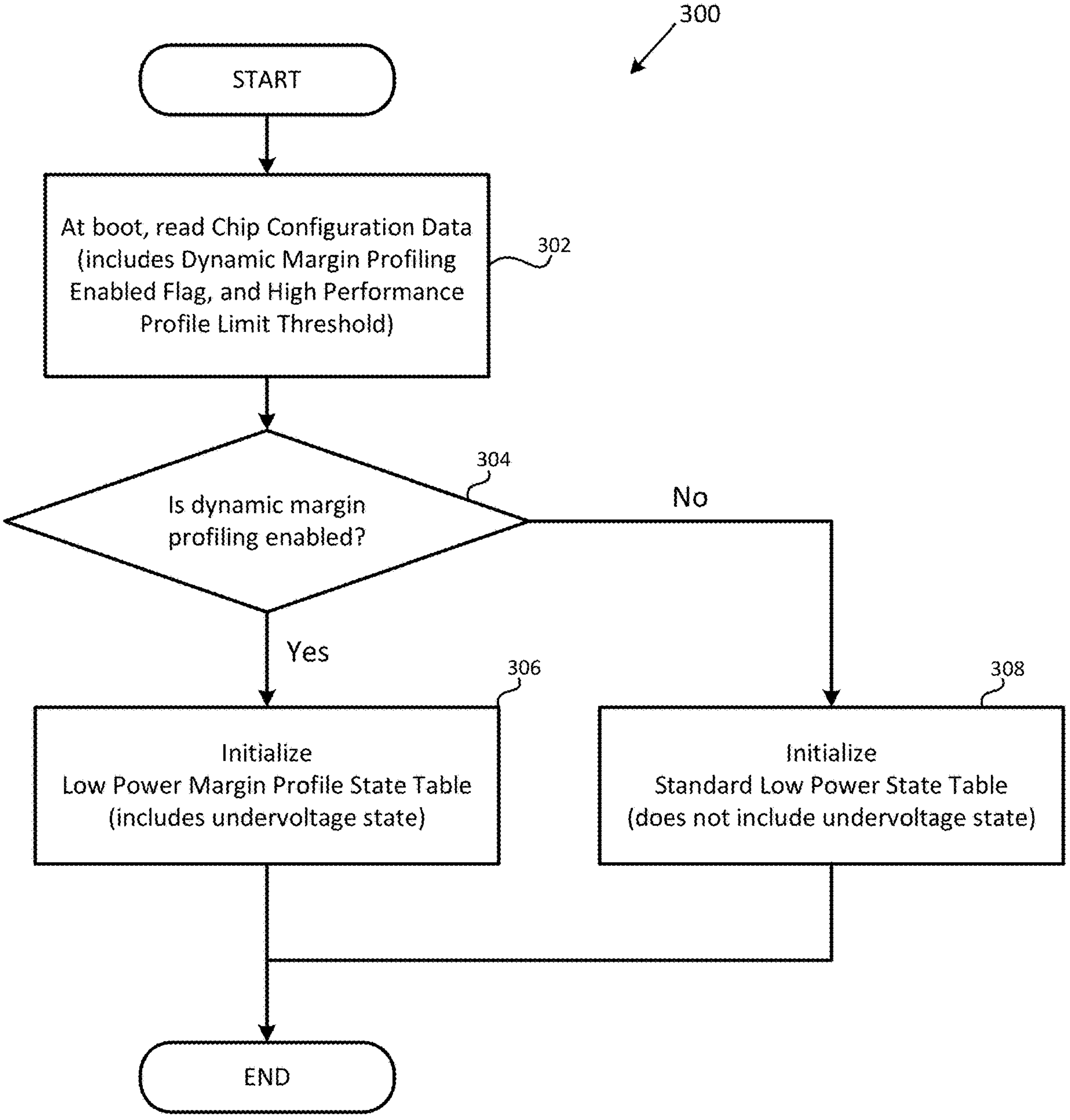
FIG. 3 is a flow chart illustrating one example of a method for determining if dynamic margin profiling is enabled to control power consumption of a functional unit in accordance with one example set forth in the disclosure.

Referring to FIG. 3, an example of a method 300 for determining if dynamic margin profiling is enabled in an apparatus, such as a processor chip, and initializing the appropriate low power state tables based on each case, is shown. The method may be carried out, for example, by the power management unit 106, or more specifically, by the state arbiter control logic circuitry 200, of the apparatus 100, or by any other suitable structure. The methods will be described with reference to the structure of FIGS. 1 and 2, however it will be recognized that any suitable structure may employ the method. It will also be recognized that operations may be rearranged as desired and the description herein is but one example. As shown in block 302, the method includes accessing the configuration data memory 237 of the functional unit 104, which includes, for example, dynamic margin profiling enabled flag and high performance profile limit threshold data 238 for each of the functional units 104. As shown in block 304, the method then includes determining, based on the data from configuration data memory 237, if dynamic margin profiling is enabled for the apparatus 100. If dynamic margin profiling is enabled, as shown in block 306, the state arbiter control logic circuitry 200 of the apparatus 100 decides that the apparatus 100 has not been allowed to operate at the high performance setting for more than the predetermined time, therefore the functional units 104 can still operate at the under-voltage margin setting with respect to the nominal product minimum voltage of the functional unit 104. As such, the state arbiter control logic circuitry 200 initializes the low power margin profile state data 208 to be used for the functional unit 104. The nominal product minimum voltage defines the lower threshold of the product-specified range of voltage levels as established by the manufacturer of the functional unit such that requirements related to yield and reliability of the functional unit are met.

Otherwise, if the state arbiter control logic circuitry 200 decides that the dynamic margin profiling has not been enabled for the apparatus 100, as shown in block 308, the state arbiter control logic circuitry 200 decides that the functional units 104 can no longer operate at the under-voltage margin setting with respect to the nominal product minimum voltage of the functional unit 104, because the apparatus 100 has been allowed to operate at the high performance setting for longer than the predetermined time. As such, referring back to FIG. 2, the state arbiter control logic circuitry 200 initializes standard low power state data 240 to be used for the functional unit 104, which does not include the under-voltage margin setting. The standard low power state data 240 may be stored in the memory 204 in a separate location from where the low power margin profile state data 208 is stored. However, other suitable configurations for storing the standard low power state data may be employed. The apparatus used in this example may include an integrated circuit which includes one or more functional units, and the functional units may include SRAM or processor cores, although any suitable apparatus and functional unit which can benefit from the DVFS technique may be employed.

Figure 4:
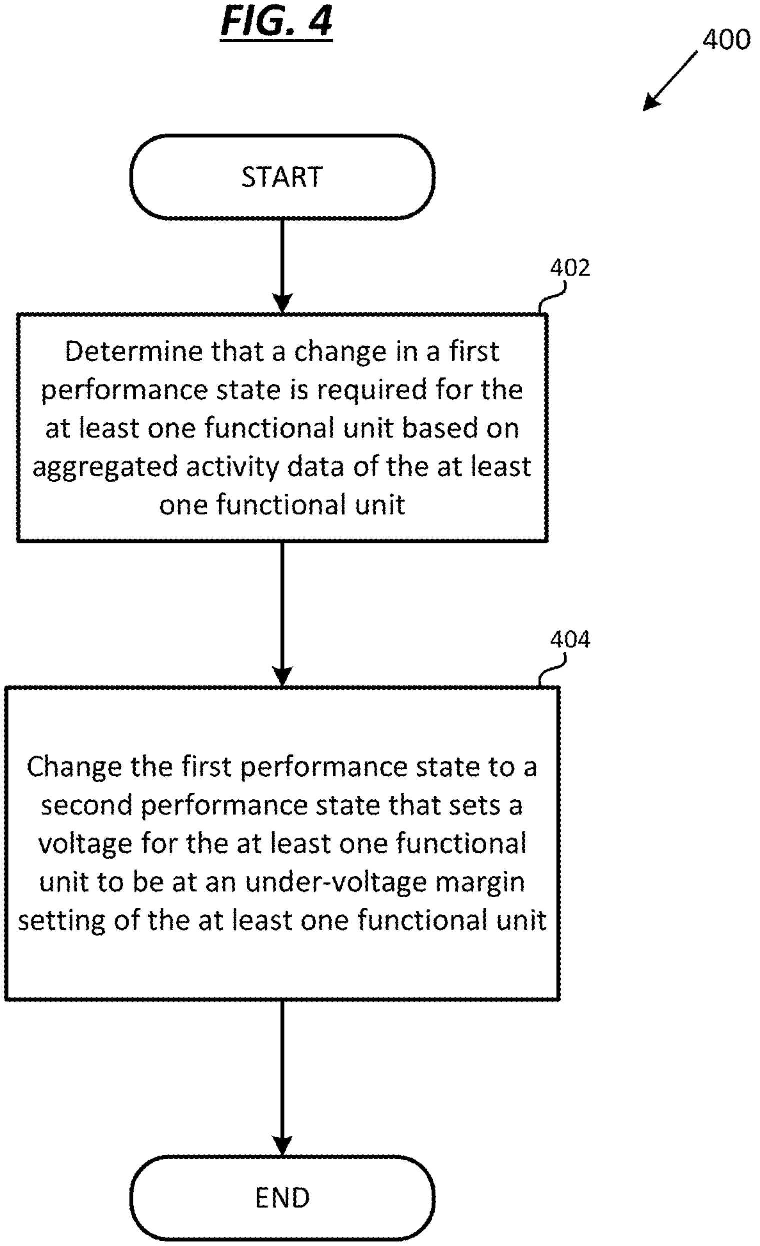
FIG. 4 is a flow chart illustrating one example of a dynamic method for controlling power consumption of a functional unit in accordance with one example set forth in the disclosure.

Referring to FIG. 4, an example of a dynamic method 400 for determining if a change of performance state is required based on the aggregated activity data memory 230, and changing the performance state to an appropriate performance state, is shown. The method may be carried out, for example, by the apparatus 100 or by any other suitable structure. The methods will be described with reference to the structure of FIGS. 1 and 2, however it will be recognized that any suitable structure may employ the method. It will also be recognized that operations may be rearranged as desired and the description herein is but one example. As shown in block 402, the method includes determining that a change in a first performance state is required for functional block 104 in an integrated circuit 102, based on the aggregated activity data memory 230. This may be done, for example, by having the aggregation logic circuitry 224 calculate the aggregated activity data memory 230 from the activity data 120 received from the monitors 108.

As shown in decision block 404, the method then utilizes changing the first performance state to a second performance state, and whether the second performance state sets the voltage of the functional unit 104 at the under-voltage margin setting depends on the aggregated activity data memory 230.

Figure 5:
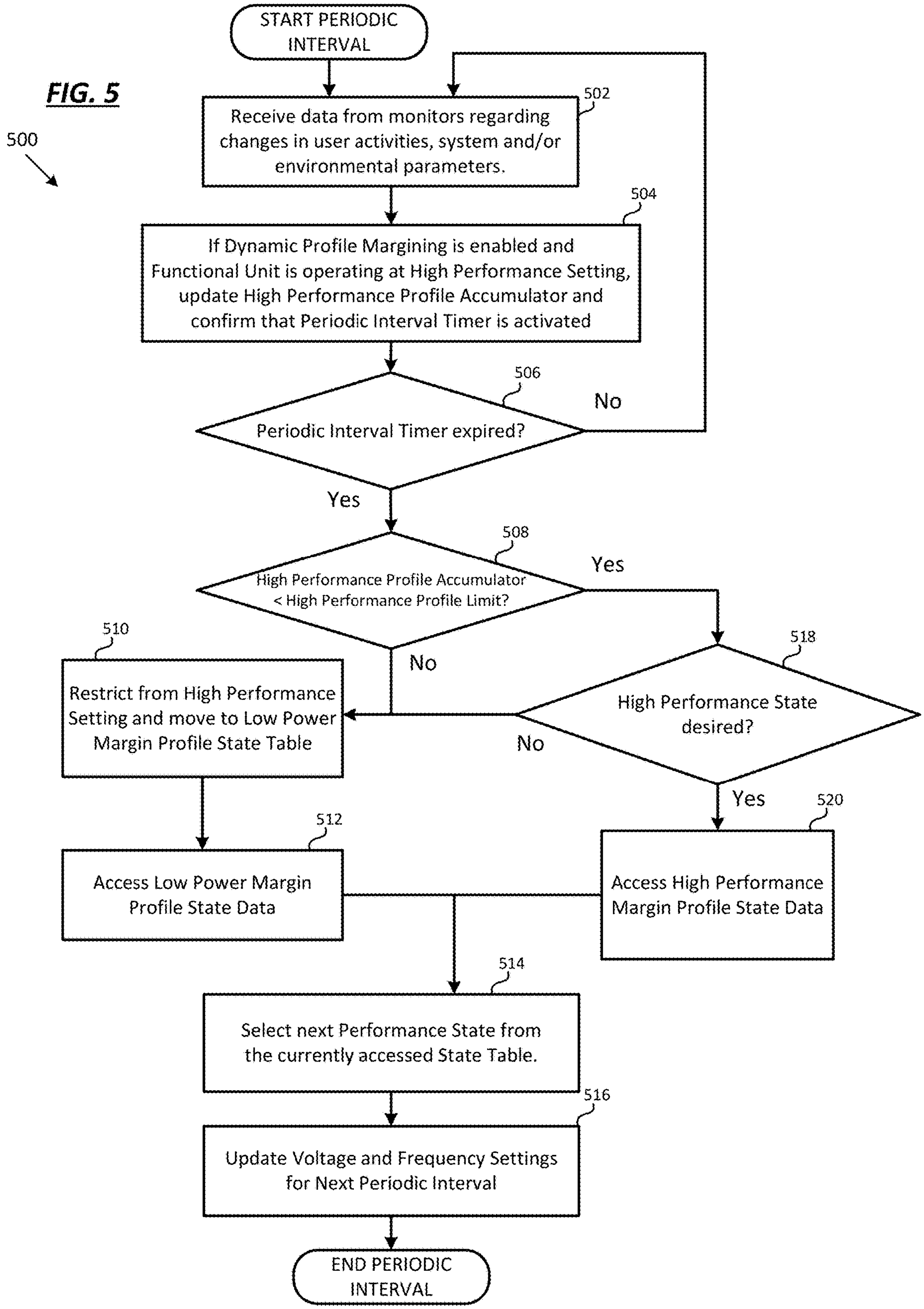
FIG. 5 is a flow chart illustrating one example of a dynamic method for controlling power consumption of a functional unit in accordance with one example set forth in the disclosure.

Referring to FIG. 5, an example of a dynamic method 500 for changing the performance state of a functional unit 104 and determining whether the functional unit 104 is allowed to continue operating at a high performance setting, or the operation at the high performance setting should be restricted based on data from the high performance profile accumulator 230 for each periodic interval, is shown. As shown in block 502, the method includes receiving data from monitors regarding changes in user activities, system parameters, and environmental parameters. This may be done, for example, by the power management unit 106, or more specifically, by the state arbiter control logic circuitry 200, which utilizes the activity data 120 sent from the monitors 108. Once the necessary data is received, and if the state arbiter control logic circuitry 200 determines that the functional unit 104 is operating at the high performance setting, as shown in block 504, the method proceeds to determine whether dynamic profile margining is enabled (the method of which is explained in detail in FIG. 3) using, for example, the state arbiter control logic circuitry 200. If the state arbiter control logic circuitry 200 decides that the dynamic profile margining is enabled for the apparatus 100, the state arbiter control logic circuitry 200 updates the high performance profile accumulator 230 and confirms that the periodic interval timer 202 is activated. If the periodic interval timer 202 is not yet activated, the state arbiter control logic circuitry 200 activates the periodic interval timer 202.

In block 506, the method includes checking whether the periodic interval timer 202 is expired. If the periodic interval timer 202 is not yet expired, the method moves back to block 502 and continues to receive data from the monitors 108. However, if the periodic interval timer 202 is expired, the method then proceeds to comparing the data of the high performance profile accumulator 230 with the corresponding high performance profile limit threshold data 238 of the functional unit 104, as shown in block 508, using the state arbiter control logic circuitry 200.

If the data of the high performance profile accumulator 230 exceeds the high performance profile limit threshold data 238, as shown in block 510, the state arbiter control logic circuitry 200 restricts the functional unit 104 from operating in the high performance setting and moves to low power margin profile state data 208, which may be a table. As such, the state arbiter control logic circuitry 200 can only access the low power margin profile state data when selecting the next performance state of the functional unit 104, as shown in block 512. Then, in block 514, the method includes selecting the next performance state of the functional unit 104, by the state arbiter control logic circuitry 200, from the currently accessed state table, which in this case is the low power margin profile state data 208. In block 516, the state arbiter control logic circuitry 200 updates the voltage and frequency settings for the next periodic interval of the functional unit 104 based on the performance state selected in block 514.

Referring back to block 508, if the data of high performance profile accumulator 230 is still within the high performance profile limit threshold data 238 when the periodic interval timer 202 expires, the state arbiter control logic circuitry 200 then decides if the high performance setting is still desired, in block 518. If the functional unit 104 no longer requires operating at the high performance setting, the method proceeds to block 510. Otherwise, the functional unit 104 still requires the high performance setting, such as for playing a movie on the electronic apparatus 100, so the method proceeds to access, by the state arbiter control logic circuitry 200, the high performance margin profile state data 206, which may be a table, as shown in block 520. Then, the method proceeds to block 514, which involves selecting the next performance state from the currently accessed state table, which in this case is the high performance margin profile state data 206. The method then proceeds to block 516.

FIG. 6 illustrates an example of the margin profiles used in accordance with one embodiment of the disclosure. The range of design voltage limitation 600 is encompassed by the combination of a high performance margin profile 602 and a low power margin profile 604. In the design voltage limitation 600, the maximum voltage possible for use in the functional unit 104 is defined by a design maximum voltage 606, and likewise the minimum voltage possible for use in the functional unit 104 is defined by a design minimum voltage 608. However, the voltage range which is typically used is defined by a nominal product maximum voltage 610 and a nominal product minimum voltage 612 as established by a manufacturer of the functional unit 104 such that requirements related to yield and reliability of the functional unit 104 are met. In this example, the voltage range 614 of the high performance margin profile 602 is defined by a profile maximum voltage 616 which is the same as the design maximum voltage 606, and a profile minimum voltage 618 which is the same as the nominal product minimum voltage 612. Likewise, the voltage range 620 of the low power margin profile 604 is defined by a profile maximum voltage 622 which is the same as the nominal product maximum voltage 610, and a profile minimum voltage 624 which is the same as the design minimum voltage 608. Also, there are a plurality of performance state indexes 626 and 628 in the high performance margin profile 602 and the low power margin profile 604, respectively. For example, if the functional unit 104 is SRAM, the design maximum voltage 606 may be 1.0 volt, the nominal product maximum voltage 610 may be 0.95 volt, the nominal product minimum voltage 612 may be 0.7 volt, and the design minimum voltage 608 may be 0.65 volt. These values are given by way of illustration only, and not to limit the scope of operable voltage range for each functional unit.

FIG. 7 illustrates an example of a set of the margin profile state data which defines the margin profiles shown in FIG. 6, used for SRAM. In this example, the margin profile state data are arranged in tables, called a high performance margin profile state table 700 and a low power margin profile state table 702. The high performance margin profile state table 700 defines the high performance margin profile 602, and the low power margin profile state table 702 defines the low power margin profile 604. Both of the margin profile state tables 700 and 702 include data such as margin table indexes 704 and 712, the performance state indexes 626 and 628, frequency settings 706 and 714, voltage settings 708 and 716, and SRAM margin settings 710 and 718.

Referring to FIGS. 2 and 7, a pointer bit stored in the memory 204, for example, defines the margin table indexes 704 and 712 in this example, and the pointer bit indicates the current profile state table being used. When the pointer bit indicates 0, then the state arbiter control logic circuitry 200 recognizes that the high performance margin profile state table 700 is used, and likewise when the pointer bit indicates 1, then the low power margin profile state table 702 is used. In this example, there are four performance state indexes 626 in the high performance margin profile state table 700 and three performance state indexes 628 in the low power margin profile state table 702; however, any number of performance state indexes may be used. For each performance state index 626 or 628, there is a corresponding frequency setting 706 or 714 and a voltage setting 708 or 716. When the state arbiter control logic circuitry 200 retrieves the margin profile data 218 and 220, the state arbiter control logic circuitry 200 decides which performance state index 626 or 628 is to be used, and sends the corresponding frequency setting 706 or 714 and voltage setting 708 or 716 as the frequency and voltage control data 122 to the power control circuit 110. The margin profile state tables 700 and 702 in this example pertain to SRAM, so the SRAM margin settings 710 and 718 specify which of the margin profiles 602 and 604 is used as a default setting or slow/minimum voltage setting for the SRAM.

Among the performance state index 626 or 628 which can be used, the standard operation performance state settings 720 in both of the margin profile state tables 700 and 702 are applied when operating voltage of the SRAM is within the voltage range bound by the nominal product maximum voltage 610 and the nominal product minimum voltage 612. Furthermore, a high performance margin profile state setting 722 includes the voltage range above the nominal product maximum voltage of SRAM, and a low power margin profile state setting 724 which includes the voltage range below the nominal product minimum voltage of SRAM. For other functional units, a different set of margin profile state tables 700 and 702 will be used so that the frequency settings and the voltage settings indicate the correct voltage ranges for operation in the corresponding functional unit. The functional units may step through each performance state sequentially to arrive at a particular target performance state, or may jump to a particular performance state, as deemed appropriate.

SRAM product minimum voltage must have margin to account for aging mechanisms which cause the required minimum voltage to increase over the life of the product. These aging mechanisms are determined by the frequency and duration of high voltage stress conditions during the product operation. Therefore, it is advantageous to monitor and limit these product high voltage conditions, so that margins impacting minimum voltages can be reduced. Furthermore, these benefits are achieved with less design area and complexity than other techniques such as the aforementioned fine grained voltage islands and dual voltage rail SRAM arrays. Other benefits and advantages will be recognized by those of ordinary skill in the art.

The above detailed description of the invention and the examples described therein have been presented for the purposes of illustration and description only and not by limitation. It is therefore contemplated that the present invention cover any and all modifications, variations or equivalents that fall within the scope of the basic underlying principles disclosed above and claimed herein.

The invention claimed is:

1. A method of controlling power consumption of at least one functional unit on an integrated circuit, the method comprising:

determining, by logic circuitry, that a change in a first performance state is required for the at least one functional unit based on aggregated activity data of the at least one functional unit; and changing, by the logic circuitry, the first performance state to a second performance state that sets voltage for the at least one functional unit to be at an under-voltage margin setting with respect to a nominal product minimum voltage of the at least one functional unit such that a voltage level of the at least one functional unit goes below the nominal product minimum voltage.

2. The method of claim 1, wherein determining that the change in the first performance state is required for the at least one functional unit includes accruing activity data representing an amount of time that the at least one functional unit has operated at a non-low power setting, and wherein the method includes restricting operation of the at least one functional unit from the non-low power setting.

3. The method of claim 2, wherein the activity data comprises at least one of: performance state data, operating voltage data, temperature data, electric current data, and margin profile state data of the at least one functional unit.

4. The method of claim 2, wherein determining that the change in the first performance state is required for the at least one functional unit further comprises:

aggregating, by the logic circuitry, the activity data of the at least one functional unit to calculate the aggregated activity data;

comparing, by the logic circuitry, the aggregated activity data to a threshold level of the at least one functional unit, wherein:

when the aggregated activity data is beyond the threshold level, the logic circuitry restricts operation of the at least one functional unit from the non-low power setting.

5. The method of claim 4, wherein:

changing the first performance state to the second performance state comprises selecting, by the logic circuitry, corresponding performance margin profile state data of the at least one functional unit based on the aggregated activity data, and the performance margin profile state data instructs the logic circuitry to enter a low power mode for the at least one functional unit when the aggregated activity data indicates that the at least one functional unit has been operating at the non-low power setting for a predetermined period of time.

6. The method of claim 2, wherein the integrated circuit comprises a plurality of different types of functional units and each of the different types of functional units has a different corresponding under-voltage margin setting and over-voltage margin setting.

7. The method of claim 6, further comprising:

accessing, by the logic circuitry, corresponding performance margin profile state data for at least one of the plurality of functional units, wherein each of the corresponding performance margin profile state data comprises a plurality of performance states for a corresponding functional unit;

wherein at least one of the performance states sets the voltage for the corresponding functional unit to be at the under-voltage margin setting of the corresponding functional unit; and wherein changing the first performance state to the second performance state comprises selecting and using at least one of the corresponding performance margin profile state data based on the aggregated activity data of the corresponding functional unit.

8. The method of claim 7, further comprising storing, by memory, the performance margin profile state data corresponding to each of the different functional units.

9. The method of claim 8, further comprising storing, by memory, data regarding the change in the first performance state of the plurality of functional units for accessing by the logic circuitry.

10. The method of claim 1, wherein the functional unit is SRAM.

11. The method of claim 1, wherein the logic circuitry comprises dynamic voltage and frequency scaling (DVFS) logic circuitry that selects the second performance state to include a change in a frequency of operation for the at least one functional unit.

12. An integrated circuit, comprising:

at least one functional unit;

a power management circuit, operatively coupled to the at least one functional unit, operative to:

control power consumption of the at least one functional unit by determining that a change in a first performance state is required for the at least one functional unit based on aggregated activity data of the at least one functional unit; and change the first performance state to a second performance state that sets voltage for the at least one functional unit to be at an under-voltage margin setting with respect to a nominal product minimum voltage of the at least one functional unit such that a voltage level of the at least one functional unit goes below the nominal product minimum voltage.

13. The integrated circuit of claim 12, wherein the power management circuit determines that the change in the first performance state is required for the at least one functional unit by accruing activity data representing an amount of time that the at least one functional unit has operated at a non-low power setting, and wherein the power management circuit restricts operation of the at least one functional unit from the non-low power setting.

14. The integrated circuit of claim 13, wherein the activity data comprises at least one of: performance state data, operating voltage data, temperature data, electric current data, and margin profile state data of the at least one functional unit.

15. The integrated circuit of claim 13, wherein the power management circuit further comprises state arbiter control logic circuitry operative to:

aggregate the activity data of the at least one functional unit to calculate the aggregated activity data;

compare the aggregated activity data to a threshold level of the at least one functional unit; and when the aggregated activity data is beyond the threshold level, restrict operation of the at least one functional unit from the non-low power setting.

16. The integrated circuit of claim 15, wherein the state arbiter control logic circuitry is further operative to select performance margin profile state data corresponding to the at least one functional unit based on the aggregated activity data, and the performance margin profile state data instructs the state arbiter control logic circuitry to enter a low power mode for the at least one functional unit when the aggregated activity data indicates that the at least one functional unit has been operating at the non-low power setting for a predetermined period of time.

17. The integrated circuit of claim 13, further comprising a plurality of different types of functional units, wherein each of the different types of functional units has a different corresponding under-voltage margin setting and over-voltage margin setting.

18. The integrated circuit of claim 17, wherein:

the power management circuit further comprises state arbiter control logic circuitry operative to access corresponding performance margin profile state data for the at least one of the plurality of functional units, the performance margin profile state data comprises a plurality of performance states, at least one of the performance states sets the voltage for the corresponding functional unit to be at the under-voltage margin setting of the corresponding functional unit; and the power management circuit is operative to change the first performance state to the second performance state by selecting and using at least one of the corresponding performance margin profile state data based on the aggregated activity data of the corresponding functional unit.

19. The integrated circuit of claim 18, further comprising memory, operatively coupled to the state arbiter control logic circuitry, operative to store the performance margin profile state data corresponding to each of the different functional units.

20. The integrated circuit of claim 19, wherein the memory is operative to store data regarding the change in the first performance state of the plurality of functional units for access by the state arbiter control logic circuitry.

21. The integrated circuit of claim 12, wherein the functional unit is SRAM.

22. The integrated circuit of claim 12, wherein the power management circuit further comprises dynamic voltage and frequency scaling (DVFS) logic circuitry that selects the second performance state to include a change in a frequency of operation for the at least one functional unit.

23. An apparatus, comprising:

an integrated circuit comprising a plurality of functional units;

a power management circuit operative to control power consumption of the plurality of functional units, operatively coupled to the plurality of functional units, comprising state arbiter control logic circuitry and memory, wherein the state arbiter control logic circuitry is operative to:

accrue activity data representing an amount of time that the plurality of functional units have operated at a non-low power setting, aggregate the activity data of the plurality of functional units to calculate aggregated activity data, compare the aggregated activity data to a corresponding threshold level and when the aggregated activity data is beyond the threshold level, restrict operation of a corresponding functional unit from the non-low power setting when the aggregated activity data is beyond the threshold level, determine that a change in a first performance state is required for the corresponding functional unit based on the aggregated activity data of the corresponding functional unit such that a voltage level of the at least one functional unit goes below the nominal product minimum voltage, change the first performance state to a second performance state that sets voltage for the corresponding functional unit to be at an under-voltage margin setting with respect to a nominal product minimum voltage of the corresponding functional unit, access corresponding performance margin profile state data for each of the plurality of functional units, each of the corresponding performance margin profile state data comprising a plurality of performance states for the corresponding functional unit, wherein at least one of the performance states sets the voltage for the corresponding functional unit to be at the under-voltage margin setting of the corresponding functional unit, and change the first performance state to the second performance state by selecting and using at least one of the corresponding performance margin profile state data based on functional unit identifier data and the aggregated activity data of the corresponding functional unit; and wherein the memory is operative to store the performance margin profile state data corresponding to each of the different functional units.

* * * * *